June 19, 1928.
V. E. NELSON
1,674,256
PACKING FOR RODS AND SHAFTS
Filed Oct. 12, 1920      2 Sheets-Sheet 1
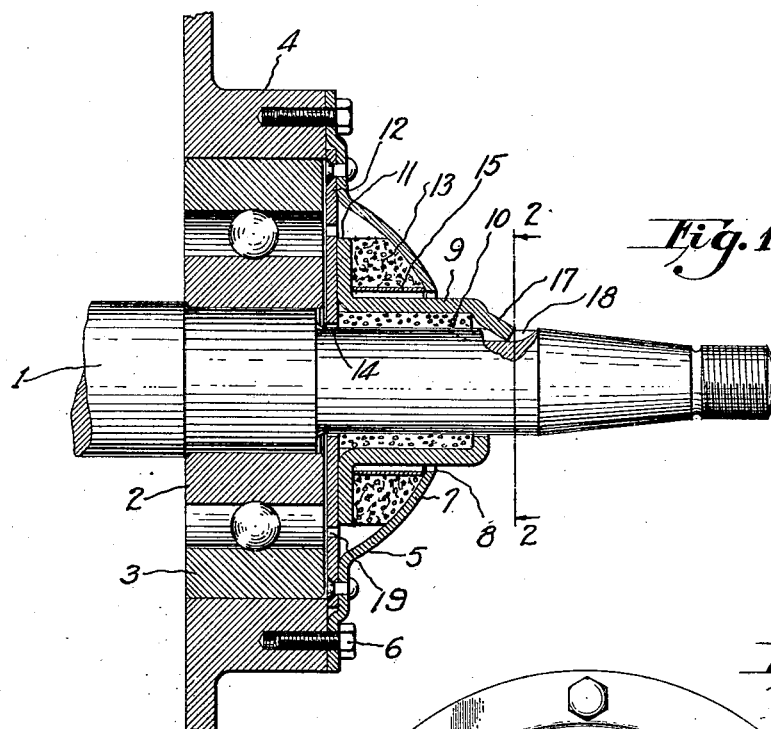
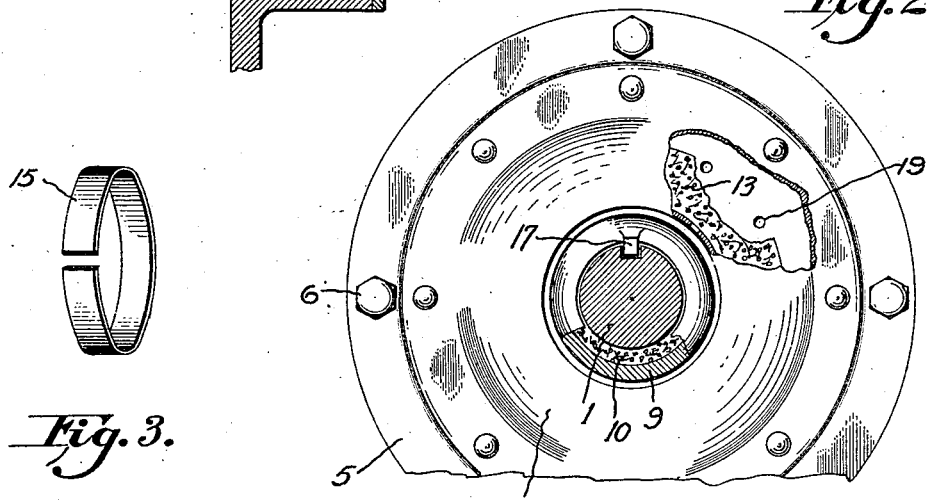
Victor E. Nelson,
INVENTOR.
BY
*Charles E. Vieux*
ATTORNEY.

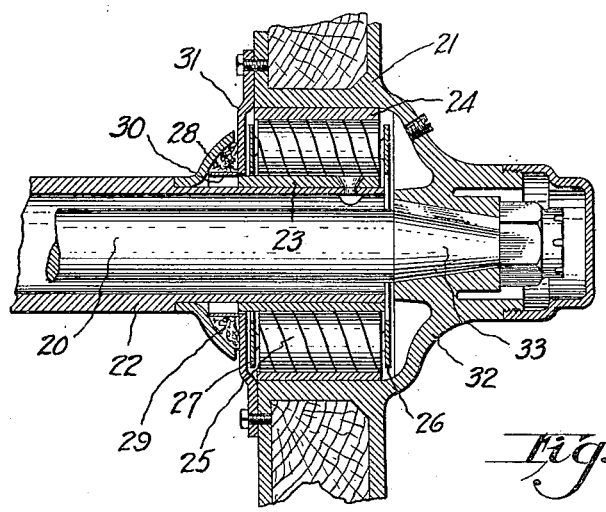
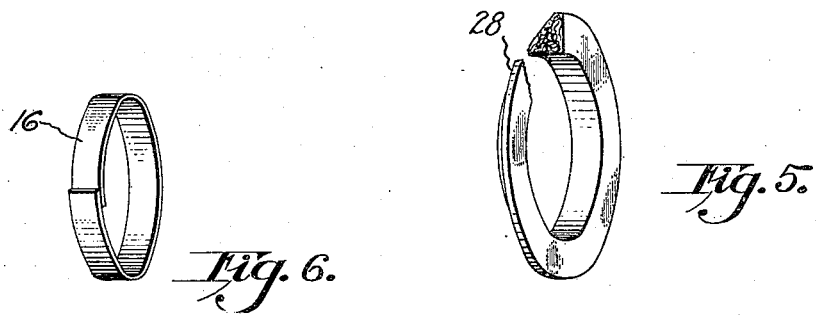

Patented June 19, 1928.

1,674,256

UNITED STATES PATENT OFFICE.

VICTOR E. NELSON, OF REDFORD, MICHIGAN.

PACKING FOR RODS AND SHAFTS.

Application filed October 12, 1920. Serial No. 416,347.

This invention relates to a packing for use in prevention of leakage of oil or grease about bearings for rods, shafts and other rotating members and the object is to provide a packing ring adapted to automatically expand to a limited extent in conjunction with a gland providing a seat therefor, the ring and gland being of a character to prevent leakage of oil through the bearing or case through which the shaft or rod may project, and the expansion of the ring automatically compensating for wear and continuously preserving a tight joint. An additional object of the invention is to provide a packing ring of cork or other material adapted to be impregnated with graphite or similar lubricant to reduce the wear of the ring to a minimum. An additional object is to provide a complete ring member of cork, leather or other more or less porous material adapted for the purpose, in conjunction with an expanding spring metal ring adapted to expand the ring member sufficiently to maintain a tight fit with the seat. An additional object of this invention is to provide a packing ring and parts of the gland including the seat that may be assembled as a unit in the required relationship of such character that the unit may be assembled or disassembled relative to the bearing and shaft without disassembling the several parts.

In that construction described and shown in U. S. Patent No. 1,120,400, bearing date of Dec. 8, 1914, granted to myself and R. G. Nelson, a self-expanding ring is provided about the shaft which seats against a collar on the shaft and a plate secured to the bearing end. In such former construction in case of repair or disassembly of the several parts for any reason it is difficult to replace the parts in their exact original relationship and such variation and reassembly of the parts is oftentimes sufficient to partially destroy the usefulness of the packing. By providing a cage or gland with which the ring is assembled previous to the assembly of the unit with the bearing, the ring member is never displaced relative to its seat and is therefore always maintained strictly in its original relationship therewith. So far as the unit construction is concerned it is immaterial whether or not the expansible ring member is a self-expanding ring or pair of rings as is set forth in said former U. S.
Patent No. 1,120,400, or whether the ring or rings are non-metallic in character or a ring of a single piece of semi-flexible material or is formed of several parts. The principal and important feature of this invention however, is in the formation of a ring of cork or leather or of similar material sufficiently porous to permit impregnation of the pores with graphite or the like and held to its seat by an expansible spring member. These and other objects and the several novel features of the invention are hereinafter more fully described and claimed, and the preferred form of construction of a packing ring and of the unit construction heretofore mentioned is shown in the accompanying drawings in which—

Fig. 1 is a vertical section showing a packing ring and gland embodying my invention.

Fig. 2 is a section taken on line 2—2 of Fig. 1 showing part of the ring cage broken away and showing the interior construction.

Fig. 3 is a detail in section of an expanding spring ring used with the packing ring.

Fig. 4 shows a different type of bearing and slightly different form of construction of the supporting cage and seat for the ring.

Fig. 5 is a detail in perspective partly in section showing the packing ring.

Fig. 6 is a view similar to Fig. 3 showing a slightly different form of expanding spring member.

In Fig. 1 I have shown the bearing as applied to a shaft 1 of comparatively high speed of rotation as for instance a crank shaft of an internal combustion engine. This shaft has a collar 2 secured thereto providing the inner member of a ball race, the outer member of which is indicated at 3 and supported in the housing 4 of the crank case. With shafts of this and other types, oil from the interior of the bearing tends to flow outward through the opening in the case or housing. Due to the speed of rotation of the shaft, oil tends to be thrown by centrifugal force outward from the shaft and the construction of the packing and supporting cage shown in Fig. 1 is adapted particularly to prevent leakage under such condition. Preferably, the cage consists of the outer member 5 which is secured directly to the housing 4 by bolts 6. The housing 5 is provided with a semispherical portion 7 having a central opening 8 through which the shaft projects and also through which projects the cylindrical member 9, the interior diameter of which is greater than the diameter of the shaft about which it is positioned. A cork or leather packing 10 of cylindrical form is interposed between the member 9 and the shaft which fits sufficiently tightly therebetween to prevent any leakage along the shaft. This member 9 is provided with a lateral flange 11 extending in overlapping relation with the semi-spherical portion 7 of the member 5. Secured to this member 5 is a plate 12 against which the flange 11 engages when the parts are assembled. The plate 12 is preferably riveted to the member 5 and with the member 9 therein and between the flange 11 and semi-spherical portion 7 of the member 5 is a packing ring 13 preferably of cork or leather which is a complete ring as will be understood from the drawings particularly Fig 5. The ring 13 has a semi-spherical face fitting the semi-spherical portion 7 and a flat face engaging the flange 11. This member 12 is apertured to permit introduction of the shaft through the cage, the aperture 14 being of a diameter somewhat greater than the shaft as shown in Fig. 1. By providing the semi-spherical face of the ring and the portion 7 of the member 5 the shaft may have a rocking motion without interfering with the seating of the packing ring. This ring is preferably of cork and is impregnated with the graphite which is forced into the pores thereof by pressure which maintains the packing ring in properly lubricated condition irrespective of whether or not oil from the bearing comes in contact with the ring. In fact the ring seats so tightly against the flange 11 and portion 7 as to prevent any seepage of oil between the bearing surfaces and, therefore, it is desirable and necessary for long life of the packing that some means of lubricant be provided. The ring is preferably formed of compressed cork which is somewhat less porous than natural cork and is more flexible permitting the ring to be expanded even though it be a complete unbroken ring. To cause the ring to always hold to its seat, I provide a flat spring metal ring 15 shown in Fig. 3 or 6. In Fig. 3 the spring ring is shown with spaced ends which are forced together to contract the ring for insertion within the inner periphery of the cork or leather packing ring 13. The tendency of the ring to expand slightly stretches the packing ring 13 as it wears thus at all times holding it firmly to its seat. The spring ring may be of the character shown in Fig. 6 where the ends are shown as overlapping and this is the preferred type of spring ring for the reason that every part of the inner periphery of the cork or leather packing ring is pressed outward. With a ring with spaced ends as shown in Fig. 3, there is a short portion of the periphery thereof that is unsupported by the metal ring and, while effective in most instances the overlapping ring of Fig. 6 is more efficient in operation.

The member 9 is provided with an outwardly extending lug 17 adapted to be pressed downward into the keyway 18 of the shaft so that the member 9 and the packing member 10 therein is made to rotate with the shaft. The keyway 18 is of such length as to permit some endwise movement of the shaft through the cage. Oftentimes shafts are subjected to slight endwise movement during rotation and the purpose of this elongated slot for the key member or lug 17 is to permit such movement without detriment to the packing. By reason of the rotation of the member 9 and flange 11 the ring member 13 may tend to rotate with the shaft or may remain stationary due to the extent of the surface in contact with the stationary member 5. In any event there is a surface of the ring subjected to wear due to revolution of the shaft, caused by the expanding ring 15 or 16, as the case may be, forcing the packing ring outwardly against the flange 11 and seat 7 and, to reduce wear to a minimum, I prefer to impregnate the cork or leather packing ring with a lubricant preferably graphite. Due to the tightness with which the packing ring is held in engagement with the parts mentioned, no oil may flow through the interstices between the packing ring and the members contacted thereby. Consequently, all leakage is prevented and due to this fact the ring is not to any desired extent lubricated by oil from the bearing which gives rise to the necessity of impregnating the ring with the lubricant. Preferably also, the inner member 12 of the cage is provided with a series of apertures 19 to permit any oil which may be forced outward into the chamber formed between the two members 5 and 12 to flow back into the bearing upon cessation of rotation of the shaft.

As heretofore stated, the ring member, which may be of cork or other flexible material, is a complete, unbroken or endless ring and being flexible is capable of being contracted or expanded in diameter to a limited extent. Thus, the semi-spherical seat may be slightly less in diameter than the normal diameter of the cork or leather ring which therefore must be compressed to be seated in the semi-spherical portion of the cage. Therefore, with the spring metal expanding ring in the interior of the cork or leather ring, the said latter ring may wear to a considerable extent and the spring ring continually force the same out into packing engagement with the seat portion.

The packing ring may be utilized without necessity of holding the same in a cage as shown in Fig. 1. One instance of this is shown in Fig. 4 which is a sectional view of a portion of an axle 20 and wheel 21. About the axle member is a housing 22 having at the end thereof a bearing comprising the inner member 23 secured directly to the housing and an outer member 24 secured in the hub of the wheel between which members 23 and 24 are interposed the roller bearings 25 and the retainers therefor 26 and 27. In this type of bearing and for various types where the speed of revolution of the shaft is comparatively slow, as for instance five hundred revolutions or less per minute, a packing member of the character here shown may be employed, and it is to be understood that this is only a specific instance in which the use of the cork or leather packing ring is desirable. In this case the housing has pressed thereonto a semi-spherical member 28 which is secured to the housing and forms a seat for the ring 29 which is of the same type as hereinafter described provided with an expanding spring metal member 30 holding it to its seat. The wheel is provided with a centrally apertured plate 31 secured thereto against which the flat face of the ring engages as shown when the wheel is assembled on the axle and housing. The spring 30 tends to hold the ring 29 in contact with the members 28 and 31 and prevents any leakage of oil from the bearing. The opposite side of the bearing is closed by the hub 32 of the wheel which is secured directly to the spindle 33 of the axle.

It is thus evident that various types of cages or seats for the ring member may be provided and that the use of the cork or leather packing ring is not confined to the unit construction or cage as shown in Fig. 1.

Having thus fully described my invention, what I claim is—

1. A packing for rods, shafts and the like comprising an inner and an outer cage member, the outer cage member having a central aperture and the inner cage member having a cylindrical portion extending therethrough and secured to rotate with the shaft, a cork packing between the cylindrical portion of the inner member and the shaft, the inner cage member having a flange portion in overlapping relationship with the outer member providing an annular seat, a cork ring member seating against the two cage members, a split spring ring within the cork expanding the same to engagement with the seat portions, a retainer member secured to the outer cage member and holding the ring and inner cage member in assembled relation therewith, the outer member and retainer being held in non-rotative relation with the shaft.

2. A packing for rods, shafts and the like comprising the combination with the shaft and its bearing and a housing for the bearing of a spherical faced member having a central aperture, a member secured thereto also having a central aperture for the shaft providing an annular chamber substantially V-shaped in cross section, the two members being secured in fixed relation with the housing for the bearing and closing the end thereof, an inner cage member comprising a cylindrical portion through which the shaft extends and a flanged portion extending into the annular recess, a cylindrical member of cork between the cylindrical portion of the inner cage and the shaft fitting the same in a manner to prevent a leakage of oil along the shaft, and means for holding the inner member and cork member to rotate with the shaft, a cork ring member having a spherical face fitting the spherical face of the first named member and a face engaging the flange of the inner member, and a split spring metal ring within the cork ring holding the same in wedging relation and between said spherical face member and said flange.

In testimony whereof, I sign this specification.

VICTOR E. NELSON.